United States Patent

Murakami et al.

[15] 3,687,950

[45] Aug. 29, 1972

[54] 2-AMINO OR METHYL SULFONYL-6-AMINO SULFONYL OR MILKY SULFONYL-4,8-DIPIPERIDINO OR MORPHOLINOPYRIMIDO[5,4-D] PYRIMIDINES

[72] Inventors: Masuo Murakami, No. 19-1-502, Sengoku 2-chome, Bunkyo-ku; Shigemi Kawahara, No. 1970-27, Kurumemachi Minamisawa, Kitatama-gun; Noriyoshi Inukai, No. 43-5, Sengoku 2-chome, Buny-ku, all of Tokyo; Sanae Ishida, No. 1-8, Motobuto 2-chome, Urawa-shi; Kazuo Imai, No. 1314, Nishincho 2-chome, Omiya-shi, both of Saitama; Teruaki Ozasa, No. 16-1, Hasune 3-chome, Itabashi-ku, Tokyo, all of Japan

[22] Filed: Nov. 20, 1969

[21] Appl. No.: 878,527

[52] U.S. Cl. .........260/246 B, 260/256.5 R, 424/248
[51] Int. Cl. .............................................C07d 87/46
[58] Field of Search..........260/256.5 R, 246 B, 247.1

[56] References Cited

UNITED STATES PATENTS 3,031,450    4/1962    Fischer et al. ..........260/247.5

*Primary Examiner*—Alex Mazel
*Assistant Examiner*—Jose Tovar
*Attorney*—Wenderoth, Lind & Ponack

[57] ABSTRACT

This invention relates to a novel pyrimido[5,4-d]-pyrimidine derivative having sulfonyl groups or a sulfonyl group substituted by a substituted or non-substituted amino group or an alkyl group at the 2- and/or 6-position. The pyrimidine derivative is useful as a platelet aggregation inhibiting agent.

10 Claims, No Drawings

2-AMINO OR METHYL SULFONYL-6-AMINO SULFONYL OR MILKY SULFONYL-4,8-DIPIPERIDINO OR MORPHOLINOPYRIMIDO[5,4-D] PYRIMIDINES

As the compounds similar to the compounds of the preset invention, there are known 2,6-bis(diethanolamino)-4,8-dipendinopyrimido[5,4-d]pyrimidine (generally known as "Dipyridamole"), 2,6-bis(ethylmercapto)-4,8-dipiperidinopyrimido-[5,4-d]pyrimidine and the like showing remarkable coronary vasodilatory activity (see; e.g., German Pat. No. 1,116,676; U.S. Pat. No. 3,031,450; and British Pat. No. 807,826).

Among these known compounds, for example, Dipyridamole is known to have a platelet aggregation inhibiting action besides the aforesaid medical action. The new compounds are used in the same manner that Dipyridamole is used when the latter is used for inhibiting platelet aggregation. However, it has been found that the compounds of the present invention have an excellent platelet aggregation inhibiting action as compared with these known compounds. Moreover, some of the compounds of this invention can be employed as the raw materials for producing Dipyridamole.

The compound of the present invention may be prepared by reacting pyrimido[5,4-d]pyrimidine substituted with a halogen atom and/or a halogenosulfonyl group and an amine to replace the halogen atom or the halogen atom of the halogenosulfonyl group with the amine.

The preparation of the compound of the present invention will be explained by referring to the typical starting material, 2-chloro-6-chlorosulfonylpyrimido[5,4-d]pyrimidine derivative.

The reaction is shown by the following reaction formula:

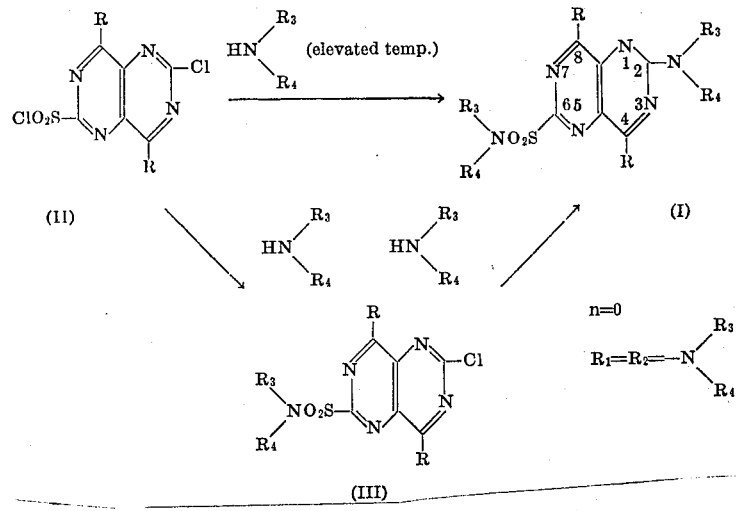

wherein R, $R_1$, $R_2$, $R_3$ and $R_4$ have the meaning previously defined.

That is, one mole of the starting material II is caused to react with more than 4 moles of an amine at an elevated temperature to provide the compound I.

The compound I may be also obtained through the reaction course II III I. That is, by reacting 1 mole of the starting material II and about 2 moles of an amine in a solvent such as dioxane, benzene dimethylformamide and the like at room temperature or under cooling, the compound III is prepared. The compound III thus prepared is mixed, with or without being isolated, with about 2 moles of amine and the mixture is reacted at an elevated temperature, preferably at a temperature lower than 150°C to provide the compound I. By employing different amines in the last step and the second step of the above reaction course, different amines can be introduced to the 2- and the 6-positions.

The compound of the present invention having alkylsulfonyl groups at the 2- and 6-positions may be obtained by reacting the starting material having chlorine atoms at the 4- and 8-positions and a heterocyclic amine, whereby the chlorine atoms thereof are substituted with said amines.

In addition, when a liquid amine is employed in the reaction, a large amount of the liquid amine is employed to utilize a part of the liquid amine as the reaction solvent.

Examples of the compounds of the present invention are shown below:

(1) 2-diethanolamino-6-methylaminosulfonyl-4,8-dipiperidinopyrimido[5,4-d]pyrimidine:

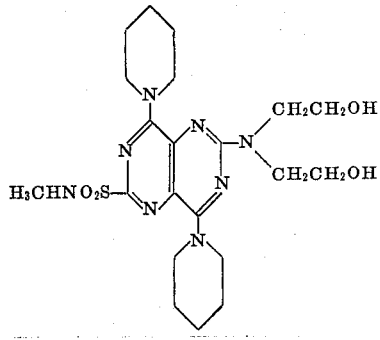

(2) 2-diethanolamino-6-ethylaminosulfonyl-4,8-dipiperidinopyrimido[5,4-d]pyrimidine:

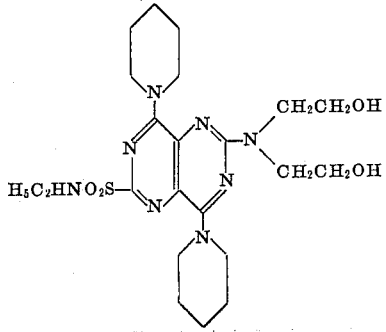

(3) 2-diethanolamino-6-diethylaminoethylamino-sulfonyl-4,8-dipiperidinopyrimido[5,4-d]pyrimidine:

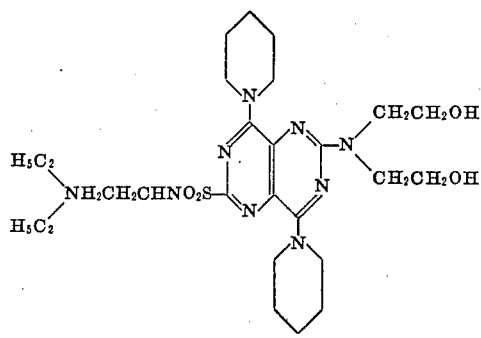

(4) 2-diethanolamino-6-diethanolaminosulfonyl-4,8-dipiperidinopyrimido[5,4-d]pyrimidine:

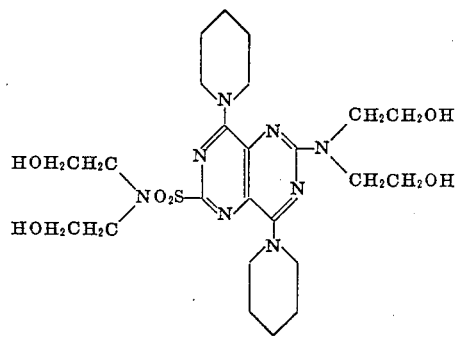

(5) 2-diethanolamino-6-(N-methyl)ethanolamino-sulfonyl-4,8-dipiperidinopyrimido[5,4-d]pyrimidine:

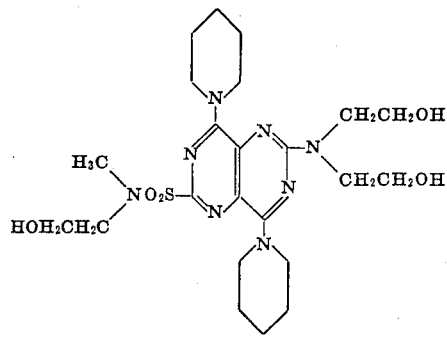

(6) 2-diethanolamino-6-morphonylsulfonyl-4,8-dipiperidinopyrimido[5,4-d]pyrimidine:

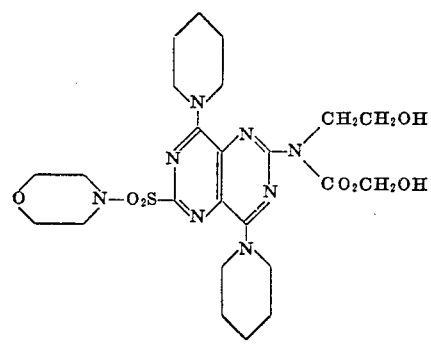

(7) 2(N-methyl)ethanolamino-6(N-methyl)ethanolaminosulfonyl-4,8-dipiperidinopyrimido[5,4-d]pyrimidine:

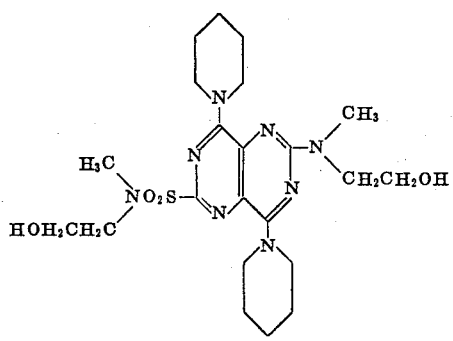

(8) 2-diethanolamino-6-diethylaminosulfonyl-4,8-dimorpholinopyrimido[5,4-d]pyrimidine:

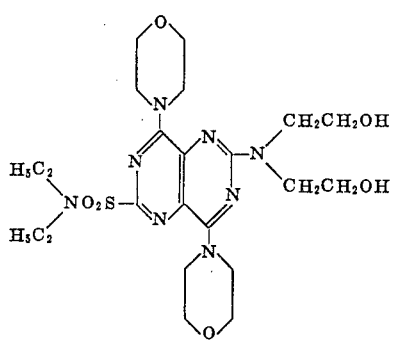

(9) 2,6-bis(methylsulfonyl)-4,8-dipiperidinopyrimido[5,4-d]pyrimidine:

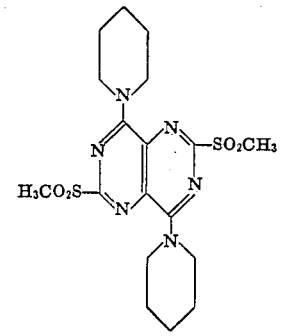

(10) 2,6-bis(diethanolaminosulfonyl)-4,8-dipiperidinopyrimido[5,4-d]pyrimidine:

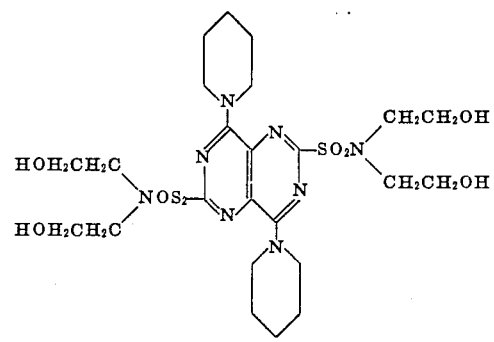

(11) 2-diethanolaminosulfonyl-6-methylsulfonyl-4,8-dipiperidinopyrimido[5,4-d]pyrimidine:

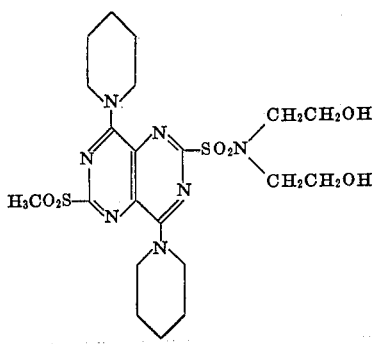

The following experiments and the results show the excellent medical effects of the compounds of the present invention.

Platelet aggregation inhibiting effect:

The effect of the compounds of the present invention for inhibiting the platelet aggregation caused by adenosine phosphate was compared with that by Dipyridamole.

Experimental procedure:

The blood recovered from the heart of a rat was mixed with a 3.8 percent sodium citrate solution so that the citrate was present in the blood in an amount of 1/10 volume part of the blood and the mixture was subjected to a centrifugal separation for 15 minutes at 1,000 rpm. to provide a platelet rich plasma (hereinafter the plasma is called "PRP").

To 2.5 ml. of PRP were added $10^{-6}$ mole of adenosine diphosphate, $10^{-4}$ mole of the compound of this invention shown by the below-showing general formula, $7 \times 10^{-2}$ mole of sodium chloride, $1.2 \times 10^{-3}$ mole of potassium chloride and $9 \times 10^{-4}$ mole of calcium chloride to provide a total volume of 5 ml.

While vigorously stirring the mixture at 25°C. by means of a thermo-mixed, the extent of the reduction of extinction coefficient caused by the aggregation of platelet was measured every 30 seconds by means of a photoelectric photometer EPO-B (filter 61) made by Hitachi, Ltd. The measurement of the extinction coefficient was made by taking the case of adding no compound of the present invention as the standard.

The extinction coefficient of the system reached the minimum value after 1–2 minutes from the start of measurement and was constant for about 5 minutes after then, the value in the period was measured. From the extinction coefficient thus obtained was calculated the platelet aggregation inhibiting rate (percent) and also the relative value thereof to that of the case of using Dipyridamole instead of the compound of this invention was also calculated, the results of which are shown in table I.

In addition, the devices used in the experiments that might possibly be brought into contact with platelets had been subjected to silicone treatment.

The compounds of the present invention used in the experiments are represented by the following general formula:

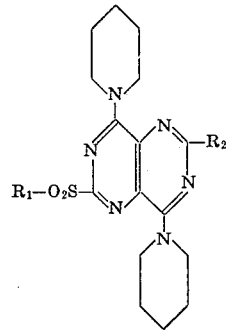

TABLE 1

| Test No. | Compound R₁ | Compound R₂ | Inhibiting ratio (percent) | Inhibition ratio |
|---|---|---|---|---|
| 1 | —NHCH₃ | —N(CH₂CH₂OH)(CH₂CH₂OH) | 26 | 1.24 |
| 2 | —NHC₂H₅ | —N(CH₂CH₂OH)(CH₂CH₂OH) | 26 | 1.24 |
| 3 | —NHCH₂CH₂N(C₂H₅)(C₂H₅) | —N(CH₂CH₂OH)(CH₂CH₂OH) | 44 | 2.09 |
| 4 | —N(CH₂CH₂OH)(CH₂CH₂OH) | —N(CH₂CH₂OH)(CH₂CH₂OH) | 47 | 2.24 |
| 5 | —N(CH₃)(CH₂CH₂OH) | —N(CH₂CH₂OH)(CH₂CH₂OH) | 29 | 1.37 |
| 6 | —N(morpholino) | —N(CH₂CH₂OH)(CH₂CH₂OH) | 38 | 1.81 |

TABLE 1 —Continued

| Test No. | Compound R₁ | Compound R₂ | Inhibiting ratio (percent) | Inhibition ratio |
|---|---|---|---|---|
| 7 | $-N\begin{smallmatrix}CH_3\\CH_2CH_2OH\end{smallmatrix}$ | $-N\begin{smallmatrix}CH_3\\CH_2CH_2OH\end{smallmatrix}$ | 35 | 1.67 |
| 8 | $-N\begin{smallmatrix}CH_3\\CH_3\end{smallmatrix}$ | $-N\begin{smallmatrix}CH_2CH_2OH\\CH_2CH_2ON\end{smallmatrix}$ | 27 | 1.28 |
| 9 | Dipyridamole | | 21 | 1.00 |

In addition, since the known compound, 2,6-bis-(ethylmercapto)-4,8-dipiperidinopyrimido[5,4-d] was insoluble in water, the platelet aggregation inhibiting effect by the compound could not be observed.

Now, the invention will be explained by the following examples but the invention shall not be limited to them.

a. Into a suspension of 0.8 g. of 2-chloro-6-mercapto-4,8-dipiperidinopyrimido[5,4-d]pyrimidine in 25 ml of methanol-water (1:4), chlorine gas was introduced for 1 hour with stirring and cooling to 4° to 5°C. The reaction product which was precipitated out was collected by filtration, washed with water and dried. The crude 2-chloro-6-chlorosulfonyl-4,8-dipiperidinopyrimido[5,4-d]pyrimidine was chromatographed on a silica-gel column using chloroform as eluent to provide 0.66 g (70 percent) of the product, melting at 228°–230°C.

b. A solution of 4.3 g of 2-chloro-6-chlorosulfonyl-4,8-dipiperidinopyrimido[5,4-d]pyrimidine prepared as above in 40 ml of chloroform was added dropwise to a solution of 2.5 g of diethanolamine in 30 ml of chloroform while stirring. After stirring for half an hour, the reaction mixture was washed with water and dried over anhydrous magnesium sulfate. The residue which was obtained by removal of the solvent was chromatographed on a silica-gel column using benzene and then ethyl acetate as eluents. The effluent was concentrated under reduced pressure to provide 3.7 g (74.6 percent) of 2-chloro-6-diethanolamino-sulfonyl-4,8-dipiperidinopyrimido[5,4-d]pyrimidine, melting at 168°C.

Analysis - $C_{20}H_{30}N_7O_4SCl$

| | C(%) | H(%) | N(%) |
|---|---|---|---|
| calcd. | 48.04 | 6.05 | 19.61 |
| found | 48.09 | 6.15 | 19.58 |

The following compounds shown by general formula were obtained by proceeding in a manner analogous to that described above, but using different amines.

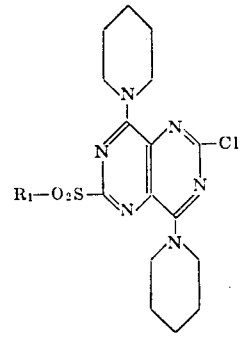

| R₁ | M.P. (°C.) | Yield (percent) | Calcd. C | Calcd. H | Calcd. N | Found C | Found H | Found N |
|---|---|---|---|---|---|---|---|---|
| $-HN-\langle H \rangle$ | 208-210 | 67 | 53.57 | 6.54 | 19.84 | 53.48 | 6.51 | 19.80 |
| $-NHCH_3$ | 203-205 | 70.6 | 47.93 | 5.68 | 23.02 | 47.99 | 5.71 | 23.12 |
| $-NHC_3H_7$ | 159-161 | 55.2 | 50.27 | 6.22 | 21.60 | 50.39 | 6.31 | 21.48 |
| $-N\begin{smallmatrix}C_3H_7\\C_3H_7\end{smallmatrix}$ | 161-164 | 68.2 | 53.27 | 6.91 | 19.77 | 53.31 | 6.88 | 19.71 |
| $-NHC_4H_9$ | 131-132 | 64.0 | 51.33 | 6.46 | 20.95 | 51.61 | 6.38 | 20.93 |
| $-N\begin{smallmatrix}CH_2CH_2OH\\CH_2CH_2OH\end{smallmatrix}$ | 168 | 74.6 | 48.04 | 6.05 | 19.61 | 48.09 | 6.15 | 19.58 |
| $-NHCH_2CH_2N\begin{smallmatrix}C_2H_5\\C_2H_5\end{smallmatrix}$ | 112-115 | 55 | 51.70 | 6.90 | 21.93 | 51.79 | 6.79 | 21.74 |

Table — Continued

| R₁ | M.P. (° C.) | Yield (percent) | Elementary analysis (percent) | | | | | |
|---|---|---|---|---|---|---|---|---|
| | | | Calcd. | | | Found | | |
| | | | C | H | N | C | H | N |
| —N(CH₃)(CH₂CH₂OH) | 115–117 | 53.2 | 48.45 | 6.21 | 20.82 | 48.50 | 6.18 | 20.89 |
| —N(C₂H₅)₂ | 152–154 | 74.5 | 51.38 | 6.47 | 20.98 | 51.49 | 6.51 | 21.01 |

EXAMPLE 1

2-diethanolamino-6-diethanolaminosulfonyl-4,8-dipiperidinopyrimido[5,4-d]pyrimidine:

Into a solution of 1.5 g of 2-chloro-6-diethanolaminosulfonyl-4,8-dipiperidinopyrimido[5,4-d]pyrimidine prepared as above in 30 ml of dioxane was added 2 g of diethanolamine. The reaction mixture was refluxed by heating for about 14 hours, and then concentrated under reduced pressure. The resulting residue poured into 50 ml of cold water to provide an oily substance, which was dissolved in 30 ml of chloroform. The chloroform solution was washed with water and dried over anhydrous sodium sulfate, and then the solvent was removed by evaporation. The obtained residue was chromatographed on a silica gel column using ethyl acetate as eluent. The effluent was concentrated under reduced pressure to provide 1.3 g (76.5 percent) of product, melting at 140°–141.5°C.

Analysis - $C_{24}H_{40}N_8O_6S$

| | C(%) | H(%) | N(%) |
|---|---|---|---|
| calcd. | 50.69 | 7.09 | 19.70 |
| found | 50.50 | 7.08 | 19.71 |

The following compounds shown by general formula were obtained by proceeding in a manner analogous to that described above, but using different amines.

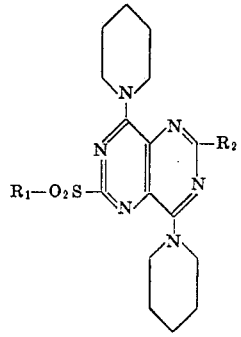

| R₁ | R₂ | M.P. (° C.) | Yield (percent) | Elementary analysis (percent) | | | | | |
|---|---|---|---|---|---|---|---|---|---|
| | | | | Calcd. | | | Found | | |
| | | | | C | H | N | C | H | N |
| —NH—C₆H₁₁ | —N(CH₂CH₂OH)₂ | 185–187 | 78 | 55.49 | 7.52 | 19.92 | 55.20 | 7.53 | 19.75 |
| —NHCH₃ | —N(CH₂CH₂OH)₂ | 153–155 | 76.2 | 50.99 | 6.93 | 22.65 | 51.04 | 7.09 | 22.75 |
| —NHC₃H₇ | —N(CH₂CH₂OH)₂ | 186.5–187.5 | 64.8 | 52.85 | 7.33 | 21.44 | 52.59 | 7.40 | 21.17 |
| —N(C₃H₇)₂ | —N(CH₂CH₂OH)₂ | 122–124 | 74.5 | 55.30 | 7.85 | 19.84 | 55.38 | 7.87 | 19.66 |
| —NHC₄H₉ | —N(CH₂CH₂OH)₂ | 165–167 | 82 | 53.71 | 7.51 | 20.88 | 53.58 | 7.73 | 20.46 |
| —N(CH₂CH₂OH)₂ | —N(CH₂CH₂OH)₂ | 140–141.5 | 76.5 | 50.61 | 7.03 | 19.68 | 50.50 | 7.08 | 19.71 |

Table—Continued

| R₁ | R₂ | M.P. (°C.) | Yield (percent) | Calcd. C | Calcd. H | Calcd. N | Found C | Found H | Found N |
|---|---|---|---|---|---|---|---|---|---|
| $-NHCH_2CH_2N\begin{smallmatrix}C_2H_5\\C_2H_5\end{smallmatrix}$ | $-N\begin{smallmatrix}CH_2CH_2OH\\CH_2CH_2OH\end{smallmatrix}$ | 99.5–101.5 | 75 | 53.86 | 7.82 | 21.74 | 53.48 | 7.88 | 21.52 |
| $-N\begin{smallmatrix}CH_3\\CH_2CH_2OH\end{smallmatrix}$ | $-N\begin{smallmatrix}CH_2CH_2OH\\CH_2CH_2OH\end{smallmatrix}$ | 109–109.5 | 38 | 51.28 | 7.11 | 20.80 | 51.30 | 7.01 | 20.73 |

EXAMPLE 2

2-diethanolamino-6-diethylaminosulfonyl-4,8-dipiperidino-pyrimido[5,4-d]pyrimidine:

A solution of 0.86 g of 2-chloro-6-chlorosulfonyl-4,8-dipiperidinopyrimido[5,4-d]pyrimidine in 20 ml of benzene was added to a solution of 1.4 g of diethylamine in 30 ml of benzene while stirring at room temperature. After stirring for 3 hours, the benzene was distilled off. To a residue, 1.05 g of diethanolamine was added and the mixture was refluxed for 1.5 hours. The reaction mixture was extracted by ethyl-acetate and the extract was chromatographed on a silica-gel column using ethyl acetate as eluent. The effluent was concentrated under reduced pressure to provide 0.44 g (41.4 percent) of pure product, melting at 118°–120°C.

Analysis - $C_{24}H_{40}N_8O_4S$

| | C(%) | H(%) | N(%) |
|---|---|---|---|
| calcd. | 53.71 | 7.51 | 20.88 |
| found | 53.83 | 7.59 | 20.69 |

The The following compounds shown by general formula were obtained by proceeding in a manner analogous to that described above, but using different amines.

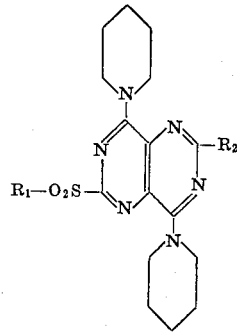

| R₁ | R₂ | M.P. (°C.) | Yield (percent) | Calcd. C | Calcd. H | Calcd. N | Found C | Found H | Found N |
|---|---|---|---|---|---|---|---|---|---|
| $-NHCH_2CH_2-\text{C}_6\text{H}_5$ | $-N\begin{smallmatrix}CH_2CH_2OH\\CH_2CH_2OH\end{smallmatrix}$ | Oil | 41.3 | 57.52 | 6.90 | 18.82 | 57.05 | 7.00 | 18.53 |
| $-N\begin{smallmatrix}\\\end{smallmatrix}\text{O (morpholino)}$ | $-N\begin{smallmatrix}CH_2CH_2OH\\CH_2CH_2OH\end{smallmatrix}$ | 160–162 | 48.6 | 52.35 | 6.96 | 20.35 | 52.05 | 6.87 | 20.12 |
| $-N\begin{smallmatrix}CH_3\\CH_3\end{smallmatrix}$ | $-N\begin{smallmatrix}CH_2CH_2OH\\CH_2CH_2OH\end{smallmatrix}$ | 143 | 29 | 51.95 | 7.13 | 22.03 | 51.99 | 7.22 | 21.82 |
| $-NHC_2H_5$ | $-N\begin{smallmatrix}CH_2CH_2OH\\CH_2CH_2OH\end{smallmatrix}$ | 164–165 | 39.0 | 51.95 | 7.13 | 22.03 | 52.16 | 7.17 | 21.75 |
| $-N\begin{smallmatrix}C_4H_9\\C_4H_9\end{smallmatrix}$ | $-N\begin{smallmatrix}CH_2CH_2OH\\CH_2CH_2OH\end{smallmatrix}$ | 108–110 | 55.6 | 56.73 | 8.16 | 18.90 | 56.88 | 8.21 | 18.74 |
| $-N\begin{smallmatrix}\\\end{smallmatrix}\text{ (piperidino)}$ | $-N\begin{smallmatrix}CH_2CH_2OH\\CH_2CH_2OH\end{smallmatrix}$ | 141–143 | 59.5 | 54.72 | 7.35 | 20.42 | 55.08 | 7.40 | 20.29 |

The starting material was prepared as follows:

To a solution of 3.0 g of 2-chloro-6-chlorosulfonyl-4,8-dimorpholinopyrimido[5,4-d]pyrimidine in 60 ml of benzene was added a solution of 3.06 g of dibutylamine in 30 ml of benzene while stirring. After stirring 2 hours, the benzene was distilled off under reduced pressure. The residue was dissolved in chloroform. The chloroform solution was washed with water and dried over anhydrous magnesium sulfate, and then the solvent was removed by evaporation. The residue was recrystallized from ethanol-chloroform to provide 2.55 g (70 percent) of 2-chloro-6-dibutylaminosulfonyl-4,8-dimorpholinopyrimido[5,4-d]-pyrimidine product, melting at 148°–149°C.

Analysis $C_{22}H_{34}N_7O_4SCl$

|  | C(%) | H(%) | N(%) |
|---|---|---|---|
| calcd. | 50.05 | 6.49 | 18.57 |
| found | 49.91 | 6.32 | 18.64 |

EXAMPLE 3

2-diethanolamino-6-dibutylaminosulfonyl-4,8-dimorpholinopyrimido[5,4-d]pyrimidine:

A mixture of 2.55 g of 2-chloro-6-dibutylaminosulfonyl-4,8-dimorpholino pyrimido[5,4-d]pyrimidine and 20 g of diethanolamine was heated to 160°C for 35 minutes while stirring. The reaction mixture was dissolved in chloroform, washed with water, dried over anhydrous magnesium sulfate and then the solvent was removed under reduced pressure. The residue was recrystallized from ethylacetate-petroleum ether to provide 2.7 g (94 percent) of product, melting at 85°C.

Analysis $C_{26}H_{44}N_8O_6S$

|  | C(%) | H(%) | N(%) |
|---|---|---|---|
| calcd. | 52.33 | 7.54 | 18.78 |
| found | 51.80 | 7.46 | 18.57 |

EXAMPLE 4

2-diethanolamino-6-diethylaminosulfonyl-4,8-dimorpholinopyrimido[5,4-d]pyrimidine:

A solution of 3.0 g of 2-chloro-6-chlorosulfonyl-4,8-dimorpholinopyrimido[5,4-d]pyrimidine in 60 ml of benzene was added to a solution of 1.8 g of diethylamine in 20 ml of benzene while stirring at room temperature. After stirring for 2 hours, the benzene was distilled off under reduced pressure. The residue was dissolved in chloroform. The chloroform solution was washed with water and dried over anhydrous magnesium sulfate, and then the solvent was removed by evaporation. To the obtained residue was added 25 ml of diethanolamine and the mixture was heated to 160°C for half an hour. The reaction mixture was dissolved in 50 ml of chloroform washed with water and dried over anhydrous magnesium sulfate and then the solvent was removed by evaporation. The obtained residue crystallizes with the addition of a small amount of petroleum ether and recrystallized from ethylacetate-petroleum ether to provide 2.1 g (52.5 percent) of product, melting at 100°C.

Analysis $C_{22}H_{38}N_8O_6S$

|  | C(%) | H(%) | N(%) |
|---|---|---|---|
| calcd. | 48.88 | 6.71 | 20.73 |
| found | 48.71 | 6.72 | 20.36 |

EXAMPLE 5

2-(N-methyl)ethanolamino-6-(N-methyl)ethanolamino-sulfonyl-4,8-dipiperidinopyrimido[5,4-d]pyrimidine:

To a solution of 1.5 g of 2-chloro-6-chlorosulfonyl-4,8-dipiperidinopyrimido[5,4-d]pyrimidine in 50 ml of benzene was added 2.63 g of N-methylethanolamine in 10 ml of benzene while stirring. After stirring for 2 hours, the benzene was distilled off under reduced pressure. The residue was dissolved in chloroform, washed with water, dried over anhydrous magnesium sulfate and then the solvent was removed by evaporation. The obtained residue was chromatographed on a silica-gel column using ethyl acetate as eluent. The effluent was concentrated under reduced pressure and the obtained residue was recrystallized from ethyl acetate petroleum ether to provide 0.5 g (42 percent) of product, melting at 115°C.

Analysis $C_{22}H_{36}N_8O_4S$

|  | C(%) | H(%) | N(%) |
|---|---|---|---|
| calcd. | 51.95 | 7.13 | 22.03 |
| found | 51.70 | 7.08 | 22.03 |

The following compounds shown by general formula were obtained by proceeding in a manner analogous to that described above, but using different amines.

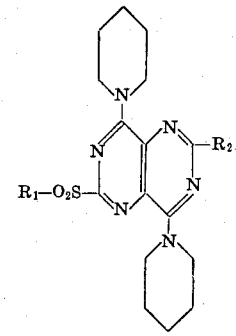

| | | | Elementary analysis (percent) | | | | | |
|---|---|---|---|---|---|---|---|---|
| | | | Calcd. | | | Found | | |
| $R_1 = R_2 =$ | M.P. (°C.) | Yield (percent) | C | H | N | C | H | N |
| —NHCH₃ | 193–194 | 35 | 51.43 | 6.67 | 26.67 | 51.19 | 6.57 | 26.44 |
| —N(CH₃)₂ | 161 | 37 | 53.55 | 7.19 | 24.99 | 53.70 | 7.30 | 24.75 |

The starting material was prepared as follows:

a. A mixture of 4g of 4,8-dihydroxy-2,6-dimercaptopyrimido[5,4-d]pyrimidine, 22 g of phosphorous pentachloride and 120 ml of phosphorous oxychloride was refluxed by heating in an oil bath for 30 minutes. The reaction mixture was concentrated under reduced pressure to give the residue, from which excess phosphorous pentachloride was sublimated as thoroughly as possible at about 70°C under reduced pressure. 4,8-dichloro-2,6-bis(chlorosulfeno)pyrimido[5,4-d]pyrimidine was precipitated out by the addition of 5 ml of chloroform to the residue, which was collected by filtration. The yield was 5.1 g (87 percent), melting point 198°–199°C.

Analysis $C_6N_4S_2Cl_4$

|  | C(%) | N(%) | Cl(%) | S(%) |
|---|---|---|---|---|
| calcd. | 21.67 | 16.77 | 42.48 | 19.20 |
| found | 21.57 | 16.57 | 42.05 | 19.40 | b. To a solution of 350 mg of 4,8-dichloro-2,6-bis(chlorosulfeno)pyrimido[5,4-d]pyrimidine obtained as above in 10 ml of a dry dioxane was added dropwise 0.8 ml of piperidine with stirring and cooling. The reaction mixture was stirred at room temperature for 1 hour and at 50°C for 30 minutes, and then concentrated. The residue was dissolved in 50 ml of chloroform and the solution was washed three times with 10 ml each of water. After the solution was dried over anhydrous sodium sulfate, the chloroform was removed by evaporation under reduced pressure. The reaction product was precipitated out as crystals by the addition of 1 to 2 ml of ethyl acetate to the obtained residue. The crystals were collected by filtration, washed with a small amount of ethyl acetate and dried to give 370 mg (67 percent) of 4,8-dipiperidino-2,6-bis(piperidinosulfeno)pyrimido[5,4-d]-pyrimidine, melting at 165°–167°C.

Analysis $C_{26}H_{40}N_8S_2$

| | C(%) | H(%) | N(%) | S(%) |
|---|---|---|---|---|
| calcd. | 59.06 | 7.62 | 21.19 | 12.13 |
| found | 58.90 | 7.36 | 20.76 | 11.86 | c. Into a suspension of 100 mg of 4,8-dipiperidino-2,6-bis(piperidinosulfeno)pyrimido[5,4-d]pyrimidine in 7 ml of water-methanol (5:2) mixture was introduced chlorine gas for 2 hours while stirring and ice-cooling. The resulting yellow crystals were collected by filtration, washed with water and dissolved in 50 ml of chloroform. The thus obtained solution was successively washed three times with 10 ml of 3 percent aqueous sodium bicarbonate, three times with 10 ml each of water and dried over anhydrous sodium sulfate. From the solution, the crude product was obtained as crystals by evaporation of the chloroform under reduced pressure, collected by filtration and washed with a small amount of ethyl acetate to give 90 mg (96 percent) of 2,6-bis(chlorosulfonyl)-4,8-dipiperidinopyrimido-[4,8-d]pyrimidine.

Analysis $C_{16}H_{20}N_6S_2O_4Cl_2$

| | C(%) | H(%) | N(%) | S(%) | Cl(%) |
|---|---|---|---|---|---|
| calcd. | 38.79 | 4.07 | 16.96 | 12.94 | 14.31 |
| found | 39.29 | 4.46 | 16.39 | 12.49 | 14.05 |

EXAMPLE 6

2,6-bis(diethanolaminosulfonyl)-4,8-dipiperidinopyrimido[5,4-d]pyrimidine:

Into a solution of 100 mg of 2,6-bis(chlorosulfonyl)-4,8-dipiperidinopyrimido[5,4-d]pyrimidine in a dry dioxane was added 85 mg of diethanolamine with stirring and cooling. Additional stirring was continued for 1 hour. The reaction mixture was concentrated under reduced pressure. The residue was dissolved in chloroform and the obtained solution was successively washed once with water, twice with 1 N aqueous hydrochloric acid, twice with 5 percent aqueous sodium bicarbonate, three times with water and dried over anhydrous sodium sulfate. From the solution, the chloroform was removed by evaporation under reduced pressure. The thus obtained light yellow oily substance was dissolved in a small amount of chloroform and purified by column chromatography on silica-gel using chloroform-methanol (13:1) mixture as eluent.

The colorless or light yellow oily substance which was obtained by concentration of the effluent was allowed to stand at room temperature. The obtained white needle product was collected by filtration and washed with a small amount of ethyl acetate. The yield of the product, having a melting point of 107°–112°C (decomposition) was 65 mg (63 percent).

Analysis $C_{24}H_{40}N_8O_8S_2$

| | C(%) | H(%) | N(%) | S(%) |
|---|---|---|---|---|
| calcd. | 45.56 | 6.37 | 17.71 | 10.13 |
| found | 45.23 | 6.26 | 17.42 | 9.97 |

EXAMPLE 7

2-diethanolaminosulfonyl-6-methylsulfonyl-4,8-dipiperidinopyrimido[5,4-d]pyrimidine:

The starting material was prepared as follows:

Into a stirred suspension of 1.2 g of 2-mercapto-6-methylthio-4,8-dipiperidinopyrimido[5,4-d]pyrimidine prepared as above in 2 ml of methanol and 12 ml of water was introduced chlorine gas for 2 hours below 5°C under ice-cooling, whereby a white crystalline precipitate was separated out. The crystalline precipitate was collected by filtration, washed with water and dissolved in ethyl acetate, and the solution was treated with charcoal and then concentrated to give 1.3 g (85.7 percent) of 2-chlorosulfonyl-6-methylsulfonyl-4,8-dipiperidinopyrimido-[5,4-d]pyrimidine, melting at 174°–176°C.

Analysis: $C_{17}H_{33}N_6ClO_4S_2$

| | C(%) | H(%) | N(%) |
|---|---|---|---|
| calcd. | 42.99 | 4.88 | 17.69 |
| found | 43.23 | 5.09 | 17.42 |

A solution of 1.4 g of 2-chlorosulfonyl-6-methyl-sulfonyl-4,8-dipiperidino-pyrimido[5,4-d]pyrimidine in 10 ml of chloroform was added dropwise into a solution of 0.95 g of diethanolamine in 20 ml of chloroform while stirring. After additionally stirring for 1 hour, the reaction mixture was washed with water, dried over anhydrous magnesium sulfate, and concentrated under reduced pressure. The oily residue was poured into water and allowed to stand overnight, whereby the reaction product was solidified. The crude product was collected by filtration and recrystallized from ethyl acetate to give 1.45 G (89.7 percent) of product, melting at 152°–153°C.

Analysis $C_{21}H_{33}N_7O_6S_2$

| | C(%) | H(%) | N(%) |
|---|---|---|---|
| calcd. | 46.39 | 6.12 | 18.03 |
| found | 46.17 | 6.14 | 17.96 |

EXAMPLE 8

2,6-bis(methylsulfonyl)-4,8-dipiperidinopyrimido[5,4-d]-pyrimidine.

The starting material was prepared as follows:

a. mixture of 2.9 g of 4,8-dihydroxy-6-mercapto-2-methylthiopyrimido[5,4-d]pyrimidine and 33 ml of 5 percent sodium hydroxide was warmed, until a clear melt had formed. After cooling, 0.9 ml of methyl iodide was added to the reaction mixture while vigorously stirring to precipitate a crude 4,8-dihydroxy-2,6-bis(methylthio)-pyrimido[5,4-d]pyrimidine as yellow crystals. After additional stirring was continued for 30 minutes, the pH of the reaction mixture was adjusted to 4 to 5 by the addition of acetic acid and allowed to stand for a while. The crude product was collected by filtration, washed with water, dissolved in dilute aqueous ammonia and the solution was then treated with charcoal. When the pH of the solution was adjusted to 4 to 5 by the addition of acetic acid, the product was reprecipitated out, which was collected by filtration. The yield was 2.76 g (90 percent), melting point above 300°C.

Analysis $C_8H_8N_4O_2S_2$

|  | C(%) | H(%) | N(%) |
|---|---|---|---|
| calcd. | 37.49 | 3.15 | 21.86 |
| found | 37.30 | 3.22 | 21.94 | b. Into a suspension of 6.4 g of 4,8-dihydroxy-2,6-dimethylthiopyrimido[5,4-d]pyrimidine prepared as above in 320 ml of water was introduced chlorine gas at 0° to 5°C while stirring, whereby crude crystals were precipitated out. After standing for a while, the crystals were collected by filtration and washed with water to give 7.6 g (95 percent) of crude 4,8-dihydroxy-2,6-bis(methylsulfonyl)pyrimido[h15,4-d]pyrimidine. The crude product was dissolved in dilute aqueous ammonia and the solution was treated with charcoal, and then the PH thereof was adjusted to 4 by the addition of acetic acid, whereby the product was reprecipitated. The product was collected by filtration to yield the pure product.

Analysis $C_8H_8N_4O_6S_2$

|  | N(%) | S(%) |
|---|---|---|
| calcd. | 18.47 | 20.02 |
| found | 18.29 | 19.80 | c. A mixture of 5.6 g of 4,8-dihydroxy-2,6-bis(methylsulfonyl)pyrimido[h15,4-d]pyrimidine prepared as above, 14.5 g of phosphorus pentachloride and 28 ml of phosphorus oxychloride was heated for 1 hour while stirring. After the reaction was completed, phosphorus oxychloride was evaporated off under reduced pressure. The residue was extracted with 30 ml of hot chloroform and the extract was cooled. The crude product which was precipitated out was washed with water to give 4.65 g (74.5 percent) of 4,8-dichloro-2,6-bis(methylsulfonyl)pyrimido[5,4-d]-pyrimidine as crystals, melting at 270°–272°C (decomposition).

Analysis $C_8H_6Cl_2N_4O_4S_2$

|  | N(%) | Cl(%) | S(%) |
|---|---|---|---|
| calcd. | 15.69 | 19.85 | 17.93 |
| found | 15.52 | 20.04 | 17.74 | d. To a suspension of 0.36 g of 4,8-dichloro-2,6-bis(methylsulfonyl)pyrimido[h15,4-d]pyrimidine prepared as above in 3.6 ml of chloroform was added dropwise 0.4 ml of piperidine with stirring, whereby a clear, yellow-brown solution was formed by a slight generation of heat accompanied. After additionally stirring for 30 minutes, the solution was washed twice with water. The chloroform layer was dried over anhydrous sodium sulfate, treated with charcoal and concentrated under reduced pressure to give 0.38 g (83 percent) of the crude 2,6-bis(methylsulfonyl)-4,8-dipiperidinopyrimido[5,4-d]-pyrimidine. On recrystallization from acetone, the fine, light yellow needles, melting at 218°–220°C, were obtained.

Analysis $C_{18}H_{28}N_6O_4S_2$

|  | C(%) | H(%) | N(%) | S(%) |
|---|---|---|---|---|
| calcd. | 47.56 | 5.77 | 18.49 | 14.08 |
| found | 47.49 | 5.69 | 18.25 | 14.10 |

What is claimed is:

1. A pyrimido [5,4-d] pyrimidine derivative represented by the formula

1. A pyrimido [5,4-d] pyrimidine derivative represented by the formula

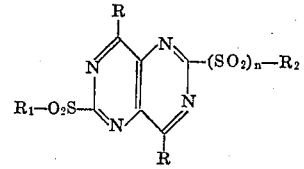

wherein R represents piperidino or morpholino; $R_1$ and $R_2$ each represents methyl, piperidino, morpholino or

$R_3$ and $R_4$ each representing a member selected from the group consisting of hydrogen, methyl, ethyl, propyl, butyl, cyclohexyl, hydroxy-ethyl and diethylamino ethyl; and n is 0 or 1, said $R_1$ and $R_2$ each representing only

when n is 0.

2. A compound according to claim 1, namely 2-diethanol-amino-6-diethanolaminosulfonyl-4,8-dipiperidinopyrimido[5,4-d]-pyrimidine.

3. A compound according to claim 1, namely 2-diethanolamino-6-diethylaminoethylaminosulfonyl-4,8-dipiperidinopyrimido-[5,4-d]pyrimidine.

4. A compound according to claim 1, namely 2-diethanolamino16-morpholinosulfonylo4,8-dipiperidinopyrimido[5,4-d]pyrimidine.

5. A compound according to claim 1, namely 2-(N-methyl)ethanolamino-6-(N-methyl)ethanolaminosulfonyl-4,8-dipiperidinopyrimido[5,4-d]pyrimidine.

6. A compound according to claim 1, namely 2-diethanolamino-6-dimethylaminosulfonyl4,8-dipiperidinopyrimido-[5,4-d]pyrimidine.

7. A compound according to claim 1, namely 2-diethanolamino-6-(N-methyl)ethanolaminosulfonyl-4,8-dipiperidinopyrimido[5,4-d]pyrimidine.

8. A compound according to claim 1, namely 2-diethanolaminosulfonyl-6-methylsulfonyl-4,8-dipiperidinopyrimido-[5,4-d]pyrimidine.

9. A compound according to claim 1, namely 2,6-bis-(diethanolaminosulfonyl)-4,8-dipiperidinopyrimido[5,4-d]pyrimidine.

10. A compound according to claim 1, namely 2,6-bis(methylsulfonyl)-4,8-dipiperidinopyrimido[5,4-d]pyrimidine.

* * * * *